April 5, 1927. Re. 16,585

H. E. HOOVER

SUCTION SWEEPER

Original Filed Oct. 9, 1916

Witness
Edward T. Wray.

Inventor
Howard Earl Hoover
by Parker & Carter
Attorneys.

Reissued Apr. 5, 1927. Re. 16,585

UNITED STATES PATENT OFFICE.

HOWARD EARL HOOVER, OF CHICAGO, ILLINOIS, ASSIGNOR, BY MESNE ASSIGNMENTS, TO THE HOOVER COMPANY, OF NORTH CANTON, OHIO, A CORPORATION OF OHIO.

SUCTION SWEEPER.

Original No. 1,286,321, dated December 3, 1918, Serial No. 124,545, filed October 9, 1916. Application for reissue filed February 11, 1920. Serial No. 357,830.

My invention relates to a brush particularly adapted for use in connection with vacuum cleaners and means for mounting the same and associating a thread guard therewith.

The brush as applied to a vacuum cleaner in one form is illustrated in the accompanying drawings wherein:—

Like parts are indicated by the same letter in all the figures.

A is the casing or hood of a vacuum sweeper, in the nozzle or open mouth of which the brush is to be placed. The brush consists of a body B which is here shown and preferably is hollow. It has enlarged ends C C and a shaft D which passes through the hollow body. In each end of the body is a bearing sleeve E through which the shaft passes. These bearing sleeves are secured in position in any desired manner and they preferably project at each end a little beyond the outer surface of the enlarged body ends C. This is only said to indicate that other features of the invention are not to be restricted to use in connection with the hollow body.

The ends of the shaft D are secured or supported in any desired manner in the frame.

Figure 1:
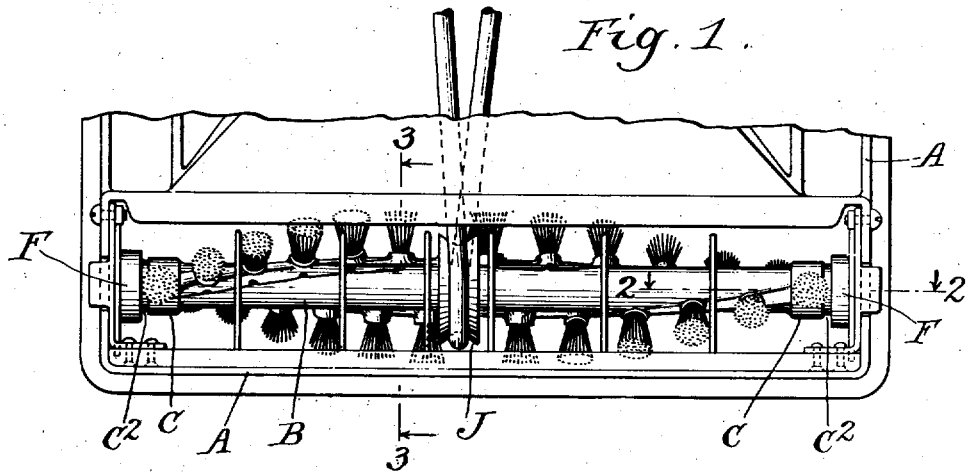
Figure 1 is a plan view with parts removed.
Figure 2:
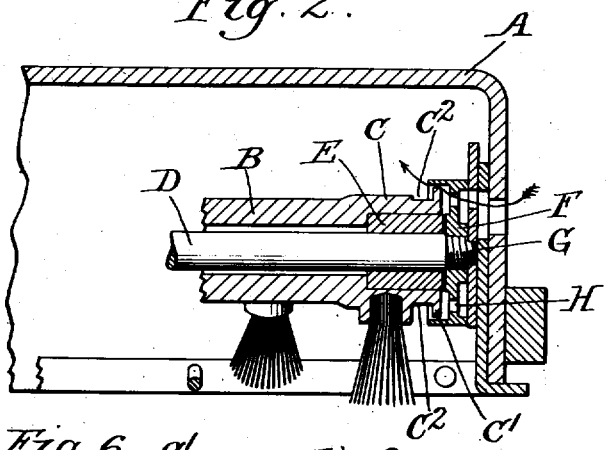
Fig. 2 is a vertical section on the line 2—2 of Fig. 1.
Figure 5:
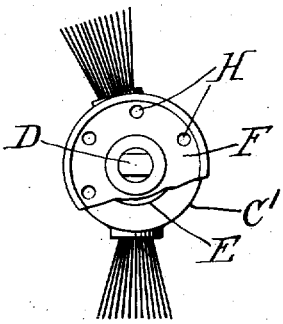
Fig. 5 is an end view of the brush and a portion of the mounting means with parts broken away.
Figure 6:
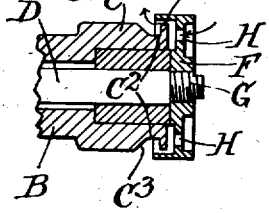
Fig. 6 is a detail cross section through the end of the brush and associated parts.
Figure 3:
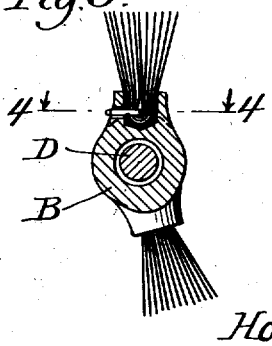
Fig. 3 is a cross section on the line 3—3 of Fig. 1.
Figure 4:
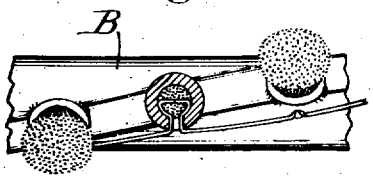
Fig. 4 is a detail section on the line 4—4 of Fig. 3.

On each end of the shaft whatever may be its structure is mounted a thread guard F which is cup-shaped. It overhangs and includes the outer end of the body and is perforated at H H so as to permit air to pass inwardly through the bottom of such cup-shaped thread guard and then outwardly through the edge of the end of the body as indicated by the arrow in Fig. 2. The parts are so arranged that the thread guard when secured on the shaft, as for example by the threads at G, the brush is prevented from longitudinal movement while being free to rotate on the shaft. The parts are also so arranged that the bottom of the cup shaped thread guard is spaced from the end of the body end thus leaving the air channel and space above referred to. On the preferred form of my device the end of the brush body takes the form of a flange $C^1$ with a depression $C^2$ thereabout. The recess or depression $C^2$ serves as a kind of receptacle or reservoir to hold hair, thread, films, and the like. One of its edges may be beveled as indicated in Fig. 6. The outer surface of the flange $C^1$, and the surface of the thread guard opposed thereto are substantially parallel with the axis of the brush, the guard flange extending inwardly along the brush beyond the brush flange.

The brush body is provided with a series of bosses projecting therefrom, and in this case arranged in the form of spirals. This reduces the labor of making the recesses into which the bunches of brush bristles have to be inserted for each boss is cast or formed integral with the body so that it is in the proper position and relation. When the boss is recessed radially the brush bristles, if inserted in such recesses, will project outwardly in the proper manner. Each boss is provided with a side perforation and of course there may be one or more, or they may be arranged in any desired manner, through which the securing wire or twine is inserted. This wire or twine passes between the bristles in the proper manner and out and thence to the next boss where in like manner it serves to secure the next set of bristles. The bosses, and therefore the bristles are arranged so as to effectually sweep practically the entire surface area included between the ends of the mouth or inlet and particularly the bristles next to the central driving pulley J are set so as to overhang the pulley face. Speaking generally of the entire structure the arrangement most effectively prevents the parts from displacement or injury or from being forced into inoperative relations. Cases and frames with which such brushes are commonly used are not infrequently made of light material capable of abundant giving and changing shape subject to blows. One object of my invention, therefore, is to mount my brush on the shaft in such way that it will not respond to or be injured by variations in the shape and form of the case support or frame. In the structure as shown the shaft and brush always maintain their parallelism and their bearing surfaces are never cramped, twisted or shifted with reference to each other.

It will be understood that I do not wish to confine myself to the particular form, size, arrangement or shape of the several parts, or to the simultaneous use of all of them. Some of them may be dispensed with without departing from the spirit of my invention, and substitutes may be employed in lieu of others. I wish my drawings to be taken as in a sense diagrammatic intending only to suggest the general principles of my invention.

The bosses in addition to the other functional results ascribed to their use, call for a minimum of material but they are only the preferred form. The centering point in the course of manufacture can be marked on the bosses so as to leave no uncertainty as to the point where the recess is to be made in order that the bristles may be in the right position. I have shown the bristles as secured by wire and suggest that they might be secured by twine and that they could also be secured in any desired manner and the parts thus could be made of any desired material. If the bristles were secured in the recesses of the bosses by other means than wire or twine the lateral perforations in the bosses could be dispensed with.

The use and operation of my invention are sufficiently suggested by the description of the form illustrated but a further statement of the matter is prepared.

The brush device when as in the illustration provided with a shaft whose ends project can be mounted in any desired manner the shaft being rotatably or otherwise supported in the frame of the case. In either event, the brush body is free to rotate on the shaft. The brush when its parts are assembled with the thread guard at the end can be inserted as a complete device in any suitable casing. With such a structure the air under proper conditions is free to move inwardly along the brush to keep thread, hair and the like from getting at the brush bearings. This action is further aided by the depression next to the end flange on the brush body. This depression and flange also tend to prevent the entrance of hair and the like in the space about the bearing.

Thus in the preferred form of the device the thread, hair and the like is prevented from entering the space about the bearing by means of the depression and the flange and such thread, hair and the like is forced out of the space around the bearing by means of the inwardly drawn current of air.

As previously suggested, an important feature of my invention whether the brush body be hollow or not and whatever may be the shaft arrangement is uniting the bearings with the brush body so as to get them permanently and rigidly mounted in proper relation and alinement. This is particularly important where a high speed brush such as that to which my improvements refer is to be mounted in a thin, light or yielding frame or case such as those usually employed in vacuum sweepers or cleaners.

I claim:

1. A brush device comprising a rotatable brush body provided with a flange on its end, a narrow circumferential groove adjacent the flange and a cup-shaped thread guard overhanging such groove.

2. A brush device comprising a rotatable brush body provided with a flange on its end, a narrow circumferential groove adjacent the flange and a cup-shaped thread guard overhanging such groove, that side of the groove opposite the flange being beveled.

3. A brush device comprising a rotatable brush body provided with a flange on its end, a narrow circumferential groove adjacent the flange and a cup-shaped thread guard overhanging such groove, said cup-shaped guard spaced from the flange so as to leave an annular opening between them.

4. A brush device comprising a rotatable brush body provided with a flange on its end, a narrow circumferential groove adjacent the flange and a cup-shaped thread guard overhanging such groove that side of the groove opposite the flange being beveled, said cup-shaped guard spaced from the flange so as to leave an annular opening between them.

5. In a suction sweeper a suction nozzle having an open suction mouth, a brush body flanged at its end mounted on the nozzle for rotation in the mouth, a guard flange surrounding and overlying the edge of said brush flange, said guard flange extending inwardly along the brush beyond the brush flange, the opposed surfaces of the two flanges being substantially parallel with the axis of the brush.

6. In a suction sweeper a suction nozzle having an open suction mouth, a brush body flanged at its end, mounted on the nozzle for rotation in the mouth, a guard flange surrounding and overlying the edge of said brush flange, said guard flange being adjacent but out of contact with the brush flange, the opposed surfaces of the two flanges being substantially parallel with the axis of the brush.

7. In a suction sweeper a suction nozzle having an open suction mouth, a brush body flanged at its end, mounted on the nozzle for rotation in the mouth, a guard flange surrounding and overlying the edge of said brush flange, said guard flange extending inwardly along the brush beyond the brush flange, said guard flange being adjacent but out of contact with the brush flange, the opposed surfaces of the two flanges being substantially parallel with the axis of the brush.

8. In a suction sweeper a suction nozzle having an open suction mouth, a brush body flanged at its end, mounted for rotation therein, a guard flange surrounding and overhanging said brush flange, said guard flange extending inwardly along the brush, said guard flange being adjacent but out of contact with the brush flange, and means for inducing a draft of air inwardly along the brush through the annular space between the periphery of each brush flange and its adjacent flange.

9. In a suction sweeper a suction nozzle having an open suction mouth, a brush body flanged at its end mounted for rotation therein, such flange projecting outwardly beyond the body of the brush, a guard flange surrounding and overhanging said brush flange said guard flange projecting along the brush beyond the brush flange, and out of contact with the brush body.

10. In a suction sweeper a suction nozzle having an open suction mouth, a brush body flanged at its end mounted for rotation therein, such flange projecting outwardly beyond the body of the brush, a guard flange surrounding and overhanging said brush flange said guard flange being adjacent but out of contact with the brush flange, and out of contact with the brush body.

11. In a suction sweeper a suction nozzle having an open suction mouth, a brush body flanged at its end mounted for rotation therein, such flange projecting outwardly beyond the body of the brush, a guard flange surrounding and overhanging said brush flange, said guard flange projecting along the brush beyond the brush flange, said guard flange being adjacent but out of contact with the brush flange, and out of contact with the brush body.

12. In a suction sweeper a suction nozzle having an open suction mouth, a brush body flanged at its end mounted for rotation therein, such flange projecting outwardly, a guard flange surrounding and overlying said brush flange, but out of contact with the brush body, means for directing a draft of air inwardly along the brush through the annular space between the periphery of said brush flange and its opposed guard flange.

13. In a suction sweeper a suction nozzle having an open suction mouth, a brush body flanged at its ends mounted for rotation therein, such flanges projecting outwardly, a guard flange surrounding and overhanging each of said brush flanges, each guard flange projecting along the brush beyond the brush flange, but out of contact with the brush body, means for directing a blast of air inwardly along the brush through the annular space between the periphery of each brush flange and its opposed guard flange.

14. A unitary removable brush body assemblage for suction sweepers comprising a shaft, a hollow brush body mounted on said shaft, guard members secured on said shaft, the guard members when secured on said shaft preventing relative longitudinal movement between the shaft and brush body, both when the assemblage is mounted in a suction sweeper and when it is removed therefrom.

15. In a suction sweeper, a unitary removable brush assemblage comprising, a shaft, a hollow brush body mounted thereon, the brush body flanged at its ends, bearing guards mounted on the shaft adjacent the ends of the brush body, the bearing guards having a guard flange surrounding and overlying the brush flange out of contact therewith, there being co-operative means on said shaft and said bearing guards whereby the guards are secured to the shaft, the guards when secured to the shaft allowing relative revolvable movement of the brush body on the shaft but preventing relative longitudinal movement thereof both when the assemblage is mounted in a suction sweeper and when removed therefrom.

Signed at the city of Chicago, county of Cook, and State of Illinois, this 28th day of January, 1920.

H. EARL HOOVER.